Patented Oct. 23, 1945

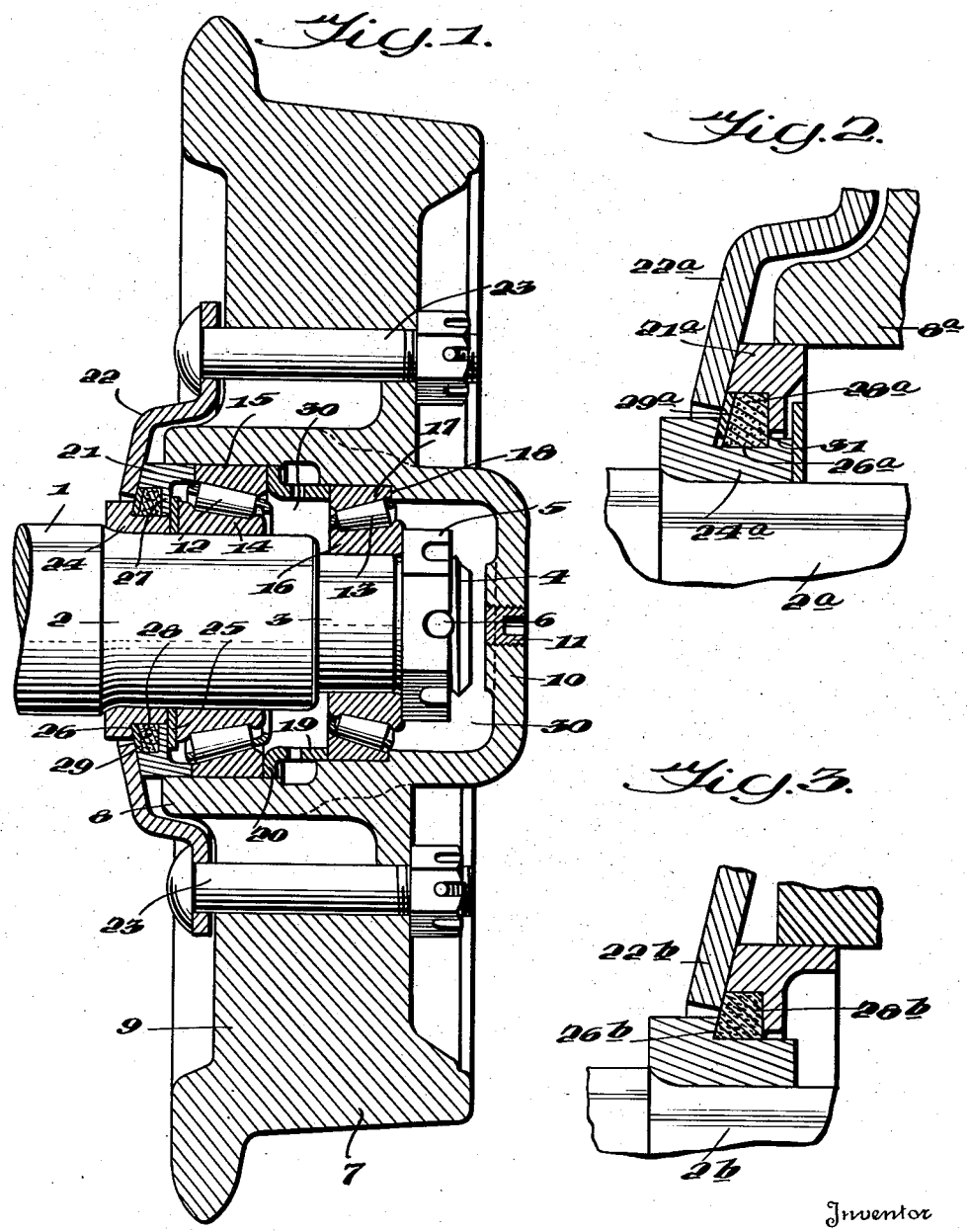

2,387,301

UNITED STATES PATENT OFFICE 2,387,301

WHEEL AND AXLE PACKING

Hugh W. Sanford, Knoxville, Tenn., assignor to The Sanford Investment Company, Wilmington, Del., a corporation of Delaware Original application February 15, 1940, Serial No. 319,121, now Patent No. 2,312,361, dated March 2, 1943. Divided and this application May 15, 1942, Serial No. 443,153

10 Claims. (Cl. 286—7)

This invention relates to improvements in wheel and axle packings, more particularly for wheels having anti-friction bearing assemblies, such as tapered roller bearings and designed for use on mine cars and the like. This application is a division of my prior application on Wheels, Serial No. 319,121, filed February 15, 1940, now Patent No. 2,312,361, granted March 2, 1943.

In a car wheel journaled on an axle with interposed anti-friction bearings therebetween, lubrication of these bearings is required. However, the rotation of the wheel relative to the axle has a tendency to eject the lubricant therefrom and it has been difficult heretofore to retain the lubricant for the bearings.

The object of this invention is to improve the sealing means between the inner end of the hub and the axle to prevent the escape of grease from within the hub and to confine the lubricant in a chamber in the hub to prevent it from leaking out, even if the sealing means should wear out.

In carrying out this object, the invention is embodied in a preferred form thereof, which is illustrated, together with modifications thereof, in the accompanying drawing, in which:

Fig. 1 is a vertical sectional view through a car wheel illustrating this invention applied thereto, parts being in elevation;

Fig. 2 is a detail sectional view therethrough showing a modified form of seal between the wheel hub and axle; and Fig. 3 is a similar view showing still another modified form of seal.

Referring to Fig. 1, an axle is designated generally by the numeral 1 provided with an axle journal 2, terminating at its outer end in a reduced journal portion 3. The extreme end of the reduced portion 3 is externally screw-threaded at 4 to receive thereon a nut 5 adapted to be adjusted and locked in place by a cotter pin 6.

Surrounding the axle 1 is a wheel which is illustrated as a car wheel provided with a tread 7 and hub 8 connected together integrally by a web or spokes 9. The inner end of the hub 8 is initially open, but the outer end (toward the outer side of the wheel) is closed by an integral end wall 10, which is provided with an orifice in which a plug 11 is fitted and through which lubricant may be introduced into the hub of the wheel for lubricating the bearings therein.

The hub 8 surrounds the journal portions 2 and 3 of the axle and is journaled thereon by two sets of anti-friction bearings 12 and 13, which are shown as tapered roller bearings, and these are spaced apart axially of the hub toward the inner and outer sides of the wheel. However, one-way end thrust ball bearings may be used instead of tapered roller bearings, if desired.

The set of roller bearings 12 is provided with an axle race 14 and a hub race 15 fitted respectively on the axle journal 2 and within the wheel hub 8. The set of anti-friction bearings 13 is provided with an axle race 16 and a hub race 17 fitted respectively upon the axle journal portion 3 and within the wheel hub 8. Although the axle race 16 is free to float axially of the axle portion 3, it is confined at one side by the nut 5, while the hub race 17 is similarly confined by abutting against a shoulder 18 in the hub 8.

The inner set of anti-friction bearings 12 takes the major part of the end thrust of the wheel when traveling around a curve particularly, and accordingly this inner set of bearings is constructed materially larger than the outer set of bearings 13 which are appreciably reduced in diameter relative thereto. This renders the hub race 17 of the roller bearings 13 smaller in outside diameter than the hub race 15 of the set of roller bearings 12. Accordingly, a spacer 19 is interposed between the hub races 15 and 17, but with an out-turned flange 20 in position to abut against the adjacent edge of the hub race 15, while the opposite end of the spacer 19 is in abutting relation with the edge of the hub race 17, whereby the opposite ends of the spacer 19 are of different external diameters corresponding respectively with the hub races and fitting corresponding portions of the inner bore of the hub 8. Thus the hub races of the bearings are slidably fitted to the inner bore of the hub capable of being drawn up in tight relation against the shoulder 18 and to take up for any play that may occur within the hub.

To accomplish this clamping action and to hold the hub-races tightly to the hub, a pressure ring 21 is provided, having one edge thereof fitted in and telescoped with the inner end of the hub 8 in abutting relation with the inner edge of the hub race 15, while the opposite edge of the pressure ring 21 projects from the end of the hub in position to receive thereagainst a retaining cap 22 that surrounds the inner end of the hub. The cap 22 and ring 21 are adapted to be drawn in an outward direction relative to the wheel by retaining bolts 23 which extend through the peripheral portion of the cap 22 and through the web or spokes of the wheel to provide for the application of pressure to the ring 21 sufficiently to apply a clamping action of the hub races 15 and 17 to the wheel hub, the spacer 19 having portions of different diameters, applying this pressure from one to the other.

Provision is made for sealing the inner end of the hub to confine the lubricant therein. For this purpose, an axle collar 24 surrounds the inner end of the axle journal 2, with a washer 25 interposed between the adjacent edges of the axle race 14 and said collar 24. The collar 24 is provided with an undercut shoulder 26 at the periphery thereof arranged in radially overlapping relation with a flange 27 formed on the inner side of the pressure ring 21 forming a labyrinth therebetween.

A packing ring 28 preferably of felt or like material, is interposed between the shoulder 26 and the flange 27. The packing ring 28 substantially fills this space and is so compressed therein transversely from an initial square or rectangular cross-section, that it tends to grip the axle collar 24 radially. The object of compressing the felt to a greater extent at its outer edge is for the purpose of giving a squeezing effect thereto, causing it to press against the periphery of the collar 24. Thus, as wear takes place, this pressure on the collar will keep up to a greater extent than it would if dependence were placed solely on the resiliency of the compressed felt to provide this radial expansion. The extra transverse pressure provided on the felt packing at its outer edge due to the tapered collars, will cause the felt to hug the axle collar more closely and for a longer time after some wear has taken place due to the rubbing of the felt against the collar, as it rotates with the wheel. Furthermore, the transverse compression of the felt tends to exert a mild pressure transversely against the shoulders, which in Fig. 2, are shown on both sides of it. In other words, this felt acts as somewhat of a spring cushion, and until it is worn considerably, the pressure of the felt is exerted three ways— namely, against the collars on either side thereof and radially against the collar or axle inside of it.

To reduce the wear on the felt of the packing ring, it may be provided with a fiber or leather friction washer 29 interposed between the inner face of the packing ring 28 and the retaining cap 22 and shoulder 26, respectively.

It will be apparent that a reservoir designated generally by the numeral 30 is formed within the hub 8 of the wheel, which may be packed with lubricant for lubricating the roller bearings, and which chamber is closed at the bottom of the wheel when standing still to a point at least as high as the inner edge of the flange 27 at the bottom, which is above the major portions of the rollers at that point. This will trap a substantial amount of lubricant in the chamber 30 against leaking out of the chamber even when the wheel is standing still. Furthermore, when the wheel is rotating rapidly, the centrifugal force would not tend to eject any of the lubricant except that which fills up the wheel to a level higher than the inermost edge of the flange 27.

In this car wheel, there is provided no packing whatever that operates between the opposed races of either set of roller bearing. The oil or lubricant is free to pass to the left of the inner set of roller bearings, but when it does so, it comes to a labyrinth formed by the packing structure. There is no exit port between the ring 21 and the hub race 15, and thus no problem of sealing at the outer circumference of the hub. The ring 21 is machined and ground to fit the hub and the hub race 15, and there is a constant pressure applied thereon by the cap 22 which keeps the ring 21 tightly engaged with the hub race 15 which prevents any leakage through the crack between them or between the ring 21 and the hub of the wheel. This provides a reservoir at the bottom of the wheel hub within the same from which no leakage is possible until the oil rises above the level of the flange 27 at the bottom of the wheel. When the oil in this reservoir rises above the inner edge of the flange at this point, it comes in contact with the packing 28.

This packing 28 rotates with the wheel relative to the axle collar 24. It is also being compressed with a radial increment of force by the pressure of the cap 22 on the washer 29, if the latter is used. This pressure forces the packing in the direction of the crack between the flange 27 and the collar 24, and since the felt packing is resilient, this pressure will continue over a long period of time in the life of the packing. Furthermore, the radial component of this pressure causes the packing 28 to press against the collar 24 and also against the washer 29, if the latter is used. If by any chance the oil should pass the packing 28, it must also pass between the washer 29 and the collar 24 before it can leak out. Since the compression of the packing is holding the washer 29 against the lateral side of the seat 26, there will be little possibility of escape of lubricant at this point, so long as the washer continues to be effective. Lubricant cannot escape through the crack between the packing 28 and the washer 29 because this packing turns with the washer and is pressed against it.

As will be evident from the foregoing, before the lubricant can escape from the chamber 30, it has to work its way out between the inner hub race 15 and axle race 14 of the bearing. Then it has to work its way downward between the washer 25 and the ring flange 27. Then it has to work its way between ring flange 27 and the outer surface of collar 24. Then it has to work its way transversely underneath the felt and between the felt and the outer surface of collar 24 against which the felt is pressing radially. Then it has to work its way out between the shoulder on the collar and the felt packing 28 or the additional packing 29, as the case may be. This means that the grease has quite a way to go. Furthermore, if any wear takes place between 29 and the shoulder on the collar, since the foreign matter, if any, gets into the wheel only at this point, this coal dust or other foreign matter will tend to accumulate in this space and provide itself an abutment under pressure which tends to prevent leakage of the grease even after the inner surface of the felt packing ring is worn and even after the normal beginning of pressure between 29 and the shoulder on 24 has been loosened by wear. This extra shoulder on the collar itself has added a great deal to the efficiency of this seal.

Therefore, this invention provides a mechanism outside the anti-friction bearings altogether, wherein the compressed and resilient felt packing is pressed, and continues to be pressed, against the surface where horizontal escape of the fluid would be possible, and is also pressed radially against the only other surface where escape of the fluid would be possible. This packing is incorporated in the wheel in connection with the pressure ring 21 which also serves the purpose of holding the wheel on the axle. The sealing means is thus incorporated between the rings 21 and 24 which are parts of the wheel and axle structure and are not added for the purpose of providing sealing means for the lubricant, thus providing an effective seal without any increase of parts except the felt packing itself, alone or with the fiber washer.

Fig. 2 shows a somewhat modified form of seal in which the axle collar 24a surrounding the axle portion 2a is provided with a groove 26a therein receiving the packing ring 28a that is interposed between the axle collar 24a and the pressure ring 21a. This provides for a shoulder 31 between the packing ring 28a and the adjacent bearing, which makes it that much more difficult for lubricant to leak past the packing ring 28a from within the chamber of the wheel, thus somewhat more effectively sealing the inner end of the hub 8a around the axle. In this event, the washer 29a should have a sufficiently large inside diameter to pass over the outer diameter of the shoulder 31, and the space between the inner edge of the washer 29a and the bottom of the groove 26a would soon fill up with heavy grease, which would mix with the dirt from the outside and would solidify to provide an automatic seal at this point which would be preserved.

The friction washer 29 of Fig. 1 may be omitted altogether, if desired, as shown in Fig. 3, where the packing ring 28b bears directly against the adjacent edge of the shoulder 26b and the retaining cap 22b. In other respects, this packing arrangement is the same as that shown in Fig. 1, but it may be provided also with the shoulder 31 of Fig. 2, if desired.

I claim:

1. The combination of an inner member, an outer member encircling said inner member and having a lubricant chamber therein, a ring extending into an end of the outer member and having a radially arranged flange thereon directed toward the inner member, said inner member having a radially extending shoulder overlapping the inner edge portion of said flange with a surface facing said flange and arranged at an acute angle thereto, packing arranged between said shoulder surface and flange, and means for applying an axial pressure against said packing at the opposite side thereof from said flange.

2. The combination of an inner member, an outer member encircling said inner member and rotatable relative thereto, said members having a lubricant chamber therebetween, a ring arranged at an end of said outer member and having an inner radially arranged flange thereon to close the outer portion of said chamber, a collar inwardly of said ring and having a side face overlapping radially a side face of said flange, a packing ring interposed between and bearing against both of said faces, and means spaced approximately radially outwardly of the collar face and coacting therewith for confining the packing ring and for applying an axial pressure against said packing ring at the opposite side thereof from said flange.

3. The combination with an axle, of a hub encircling the axle and having a lubricant chamber therein, a ring extending into an end of the hub and having a radially arranged flange thereon directed toward the axle, said axle having a radially extending shoulder overlapping the inner edge portion of said flange with a surface facing said flange and arranged at an acute angle thereto, a packing ring interposed between said shoulder and flange in radially overlapping relation therewith, and means for applying an axial pressure against said packing ring at the opposite side thereof from said flange.

4. In a wheel having a hub adapted to receive an axle therein and to be journaled on said axle, said hub having a lubricant chamber therein, a ring arranged at an end of said hub and having an inner radially arranged flange thereon to close the outer portion of said chamber, a collar adapted to fit about the axle and spaced inwardly of said ring, said collar having a side face overlapping radially a side face of said flange at an acute angle thereto and cooperating therewith for preventing leakage from said chamber, packing interposed between said collar and flange side faces, and a retaining cap overlapping the ring and packing and bearing laterally thereagainst applying an axial pressure to said packing.

5. In a hub adapted to receive an axle therein and to be journaled on said axle, said hub having a lubricant chamber therein, a ring arranged at an end of said hub and having an inner radially arranged portion thereof to close the outer portion of said chamber, and a collar adapted to fit about the axle and spaced radially inwardly of the hub from said ring, said collar having a side face overlapping radially a side face of said ring inner portion and opposed thereto axially of the hub, a packing ring interposed between said opposed faces and bearing thereagainst for preventing leakage from said chamber, and means spaced approximately radially outwardly of the collar face and coacting therewith for confining the packing ring and for applying an axial pressure against said packing ring at the opposite side thereof from said ring inner portion.

6. In a rotatable body having a hub adapted to receive an axle therein and to be journaled on the axle, said hub having a lubricant chamber therein, a ring arranged at an end of said hub and having an inner radially arranged flange thereon extending inwardly relative to the lubricant chamber, and a collar adapted to extend about the axle and having a side face arranged in opposed relation to the flange at an acute angle thereto and overlapping said flange radially on the opposite side thereof from the lubricant chamber, packing interposed between said collar face and the flange for preventing leakage from said chamber, and a cap arranged at the inner end of the hub overlapping the packing ring in position to apply pressure thereto.

7. The combination with an axle, of a wheel having a hub encircling the axle and having a lubricant chamber therein, a ring extending into the inner end of the hub and having a radially arranged flange thereon directed toward the axle, said axle having a radially extending shoulder overlapping the inner edge portion of said flange with a surface facing said flange and arranged at an acute angle thereto, a resilient packing ring interposed between said shoulder and flange in radially overlapping relation therewith, said packing ring being formed of fibrous absorbent material, and a friction washer interposed between said ring and the shoulder.

8. In a wheel having a hub adapted to receive an axle therein and to be journaled on said axle, said hub having a lubricant chamber therein, a ring arranged at an end of said hub and having an inner radially arranged flange thereon to close the outer portion of said chamber, a collar adapted to fit about the axle and spaced inwardly of said ring, said collar having a side face overlapping radially a side face of said flange at an acute angle thereto and at the opposite side of said flange from the lubricant chamber, yieldable packing interposed between said faces of the collar and flange, and a retaining cap secured to the wheel and clamping the ring in the hub, said cap overlapping the packing and bearing thereagainst compressing the same axially.

9. In a wheel having a hub adapted to receive an axle therein and to be journaled on said axle, said hub having a lubricant chamber therein, a ring arranged at an end of said hub and having an inner radially arranged flange thereon to close the outer portion of said chamber, a collar adapted to fit about the axle and spaced inwardly of said ring, said collar having a side face overlapping radially a side face of said flange at an acute angle thereto and at the opposite side of said flange from the lubricant chamber, yieldable packing interposed between said faces of the collar and flange, and a retaining cap secured to the wheel and clamping the ring in the hub, said cap overlapping the packing and bearing thereagainst compressing the same axially, said retaining ring having the face thereof bearing against the packing arranged parallel with the collar face at an acute angle to the ring flange, whereby the packing is pressed inward and axially toward the inner edge of the ring flange upon rotation of the wheel on the axle.

10. The combination with an axle, of a wheel hub rotatably encircling the axle and having a lubricant chamber therein, a ring arranged at an end portion of said hub with an inner radially arranged flange thereon to close the outer portion of said chamber, said axle having a side face overlapping radially a side face of the flange, yieldable packing interposed between the respective side faces of the axle and flange, cap means spaced approximately radially outwardly of the axle face and for applying an axial pressure against said packing at the opposite side thereof from said flange, and an approximately radial washer interposed between the packing and the cap means and axle face and pressed thereagainst by the packing, said washer having an outer face portion overlapping the adjacent portions of the axle face and cap means.

HUGH W. SANFORD.